(12) United States Patent
Oshima (10) Patent No.: US 8,249,784 B2
(45) Date of Patent: Aug. 21, 2012

(54) CONTROL APPARATUS AND CONTROL METHOD FOR AUTOMATIC TRANSMISSION

(75) Inventor: Koji Oshima, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/255,535

(22) PCT Filed: Feb. 25, 2010

(86) PCT No.: PCT/IB2010/000379
§ 371 (c)(1),
(2), (4) Date: Sep. 9, 2011

(87) PCT Pub. No.: WO2010/103358
PCT Pub. Date: Sep. 16, 2010

(65) Prior Publication Data
US 2011/0320097 A1    Dec. 29, 2011

(30) Foreign Application Priority Data
Mar. 12, 2009    (JP) .................................. 2009-059614

(51) Int. Cl.
*G06F 7/00* (2006.01)
(52) U.S. Cl. ............................................. 701/51
(58) Field of Classification Search ............. 701/51, 701/52, 95; 477/34, 77
See application file for complete search history.

(56) References Cited

U.S. PATENT DOCUMENTS

| | | | | |
|---|---|---|---|---|
| 5,803,866 A | * | 9/1998 | Tsukamoto et al. | 477/132 |
| 6,503,170 B1 | * | 1/2003 | Tabata | 477/97 |
| 2003/0013571 A1 | * | 1/2003 | Tabata | 475/125 |
| 2003/0114975 A1 | * | 6/2003 | Berger et al. | 701/55 |

FOREIGN PATENT DOCUMENTS

| | | |
|---|---|---|
| EP | 1 188 961 A2 | 3/2002 |
| EP | 1 431 625 A1 | 6/2004 |
| JP | A-2008-32156 | 2/2008 |
| JP | A-2008-223939 | 9/2008 |
| WO | WO 03/029699 A1 | 4/2003 |
| WO | WO 2008/126813 A2 | 10/2008 |

OTHER PUBLICATIONS

Jun. 9, 2010 International Search Report in Application No. PCT/IB2010/000379.
Written Opinion of the International Searching Authority issued in International Application No. PCT/IB2010/000379 on Jun. 9, 2010.

* cited by examiner

*Primary Examiner* — Kim T Nguyen
(74) *Attorney, Agent, or Firm* — Oliff & Berridge, PLC

(57) ABSTRACT

When a post-direct shift gear position does not match a target gear position during a direct shift but before engagement of an input clutch for the post-direct shift gear position begins, an ECU executes engagement control on a reaction brake for the new target gear position instead of executing engagement control on a reaction brake for the post-direct shift gear position, and executes engagement control on an input clutch for the new target gear position instead of executing engagement control on an input clutch for the post-direct shift gear position.

9 Claims, 7 Drawing Sheets

|      | C1 | C2 | B1 | B2 | B3 | F |
|------|----|----|----|----|----|---|
| 1ST  | ○  | ×  | ×  | ◎  | ×  | △ |
| 2ND  | ○  | ×  | ○  | ×  | ×  | × |
| 3RD  | ○  | ×  | ×  | ×  | ○  | × |
| 4TH  | ○  | ○  | ×  | ×  | ×  | × |
| 5TH  | ×  | ○  | ×  | ×  | ○  | × |
| 6TH  | ×  | ○  | ○  | ×  | ×  | × |
| R    | ×  | ×  | ×  | ○  | ○  | × |
| N    | ×  | ×  | ×  | ×  | ×  | × |

○ ENGAGED
× DISENGAGED
◎ ENGAGED DURING ENGINE BRAKING
△ ONLY ENGAGED DURING DRIVING

CONTROL APPARATUS AND CONTROL METHOD FOR AUTOMATIC TRANSMISSION

BACKGROUND OF THE INVENTION

1. Field of the Invention

The invention relates to a control apparatus and a control method for an automatic transmission, and more particularly to direct shift control in which two or more frictional engagement elements are engaged while disengaging two or more frictional engagement elements.

2. Description of the Related Art

Constitutional components of an automatic transmission for a vehicle include a planetary gear constituted by rotary elements such as a sun gear, a ring gear and a carrier, and frictional engagement elements. In this type of automatic transmission, a plurality of gear positions are achieved by switching a torque transmission path from an engine in accordance with a combination of engaged frictional engagement elements. In particular, an automatic transmission having a large number of gear positions (a sixth speed automatic transmission, for example) is provided with both a plurality of clutch elements serving as input elements and a plurality of brake elements serving as reaction elements.

In this type of automatic transmission, when a shift is performed from a current gear position to a gear position that is higher or lower than the current gear position by a plurality of positions in accordance with a shift operation, an acceleration request, or the like, the shift may be performed by switching both the input element and the reaction element. In this case, the shift is sometimes performed by switching either the input element or the reaction element to achieve an intermediate gear position, and then switching the other.

Shift control for switching the gear position in two stages via an intermediate gear position is conventionally available. For example, a shift control apparatus disclosed in International Patent Application Pamphlet WO2003/029699 includes means for determining a dual changeover shift from an Nth speed achieved by at least engaging a first friction element and a second friction element to an N-αth speed achieved by at least disengaging the first friction element and the second friction element and engaging a third friction element and a fourth friction element. An intermediate gear position achieved by engaging the second friction element and the third friction element exists between the Nth speed and the N-αth speed. This shift control apparatus also includes: means for achieving the shift from the Nth speed to the N-αth speed when a dual changeover shift is determined by at least disengaging the first friction element and engaging the fourth friction element, reducing an engagement force of the second friction element before a gear ratio reaches a gear ratio corresponding to the intermediate gear position, and at least disengaging the second friction element and engaging the third friction element after the gear ratio passes the gear ratio corresponding to the intermediate gear position; means for deciding to prohibit modification of a target gear position from the N-αth speed until shift control is complete at a predetermined timing following the start of the shift from the Nth speed to the N-αth speed; and means for reconfirming an intention of a driver to perform a shift when the gear ratio reaches the gear ratio corresponding to the intermediate gear position and permitting modification of the target gear position to a gear position corresponding to the intention of the driver when the target gear position differs from the N-αth speed, even if modification of the target gear position is prohibited.

According to the shift control apparatus for an automatic transmission disclosed in International Patent Application Pamphlet WO2003/029699, when the driver intends to modify the gear position, a shift can be achieved in a short period of time, and when the driver does not intend to modify the gear position, an oil pressure of a high clutch is reduced before reaching a gear ratio corresponding to a fifth speed. Hence, the shift is not determined, and therefore a plurality of shift shocks do not occur during a dual changeover. Accordingly, when the driver does not intend to modify the gear position, a smooth dual changeover shift can be achieved.

Although International Patent Application Pamphlet WO2003/029699 describes shift control for switching the gear position in two stages via an intermediate gear position during a shift from a current gear position (Nth speed) to a gear position (N-αth speed) been higher or lower than the current gear position by a plurality of positions, no mention is made of shift control (direct shift control) for switching the gear position in a single stage without passing through an intermediate gear position. Accordingly, measures to be taken when the target gear position changes during direct shift control that does not pass through an intermediate gear position are not disclosed.

SUMMARY OF THE INVENTION

The invention relates to an automatic transmission in which direct shift control that does not pass through an intermediate shift position is performed, and provides a control apparatus and a control method that can realize a shift to a new shift position promptly, without generating shift shock, after determining during a direct shift that a shift is to be performed to the new shift position.

A first aspect of the invention relates to a control apparatus that controls an automatic transmission. In the automatic transmission according to the first aspect, a first shift position is achieved by engaging a first element and engaging a second element, a second shift position is achieved by engaging a third element and engaging a fourth element, an intermediate shift position exists between the first shift position and the second shift position, the third element does not transmit an input torque of the automatic transmission to an output shaft of the automatic transmission when engaged individually, and the fourth element transmits the input torque of the automatic transmission to the output shaft of the automatic transmission even when engaged individually. The control apparatus according to the first aspect includes: a first determination unit that determines whether or not engagement of the fourth element is yet to begin during a direct shift in which a shift is performed from the first shift position to the second shift position without passing through the intermediate shift position by disengaging the first element, disengaging the second element, engaging the third element, and engaging the fourth element; a second determination unit that determines whether or not a shift is to be performed to a third shift position which is different to the second shift position; and a control unit that halts the direct shift and executes a shift to the third shift position when the second determination unit determines that a shift is to be performed to the third shift position before engagement of the fourth element begins.

In the control apparatus, the second determination unit may determine whether or not a shift is to be performed to the third shift position by determining whether or not the second shift position differs from a current target shift position. In the control apparatus, if engagement of the third element has already begun when the second determination unit determines that a shift is to be performed to the third shift position before engagement of the fourth element begins, the control unit may halt engagement of the third element and begin disengagement of the third element and engagement of an element for achieving the third shift position.

In the control apparatus, the automatic transmission may be constituted such that the third shift position is achieved by engaging a fifth element and engaging a sixth element, the fifth element does not transmit the input torque of the automatic transmission to the output shaft of the automatic transmission when engaged individually, and the sixth element transmits the input torque of the automatic transmission to the output shaft of the automatic transmission even when engaged individually, and if engagement of the third element has already begun when the second determination unit determines that a shift is to be performed to the third shift position before engagement of the fourth element begins, the control unit may halt engagement of the third element, begin disengagement of the third element and engagement of the fifth element, and then begin engagement of the sixth element. In the control apparatus, the first determination unit may determine that engagement of the fourth element is yet to begin either when engagement control of the fourth element has not yet begun or when an elapsed time from the beginning of engagement control of the fourth element has not yet reached a predetermined time. In the control apparatus, the control unit may continue the direct shift when it is determined that engagement of the fourth element has begun.

In the control apparatus, the control unit may continue the direct shift when the second determination unit determines that a shift is to be performed to the third shift position after engagement of the fourth element begins. In the control apparatus, the automatic transmission may be constituted such that the first element does not transmit the input torque of the automatic transmission to the output shaft of the automatic transmission when engaged individually, and the second element transmits the input torque of the automatic transmission to the output shaft of the automatic transmission even when engaged individually, and during the direct shift, the control unit may begin to disengage the first element after beginning to disengage the second element.

A second aspect of the invention relates to a control method for controlling an automatic transmission. In the automatic transmission, a first shift position is achieved by engaging a first element and engaging a second element, a second shift position is achieved by engaging a third element and engaging a fourth element, an intermediate shift position exists between the first shift position and the second shift position, the third element does not transmit an input torque of the automatic transmission to an output shaft of the automatic transmission when engaged individually, and the fourth element transmits the input torque of the automatic transmission to the output shaft of the automatic transmission even when engaged individually. In the control method according to the second aspect, a determination is made as to whether or not engagement of the fourth element is yet to begin during a direct shift in which a shift is performed from the first shift position to the second shift position without passing through the intermediate shift position by disengaging the first element, disengaging the second element, engaging the third element, and engaging the fourth element, a determination is made as to whether or not a shift is to be performed to a third shift position which is different to the second shift position, and when it is determined that a shift is to be performed to the third shift position before engagement of the fourth element begins, the direct shift is halted and a shift is executed to the third shift position.

According to the invention, when it is determined that a shift is to be performed to a new shift position during a direct shift that does not pass through an intermediate shift position, the shift to the new gear position can be realized promptly without generating shift shock.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the invention will be described below with reference to the drawings. In the following description, identical reference symbols have been allocated to identical components, the names and functions of which are also identical. Accordingly, detailed description of these components will not be repeated.

Figure 1:
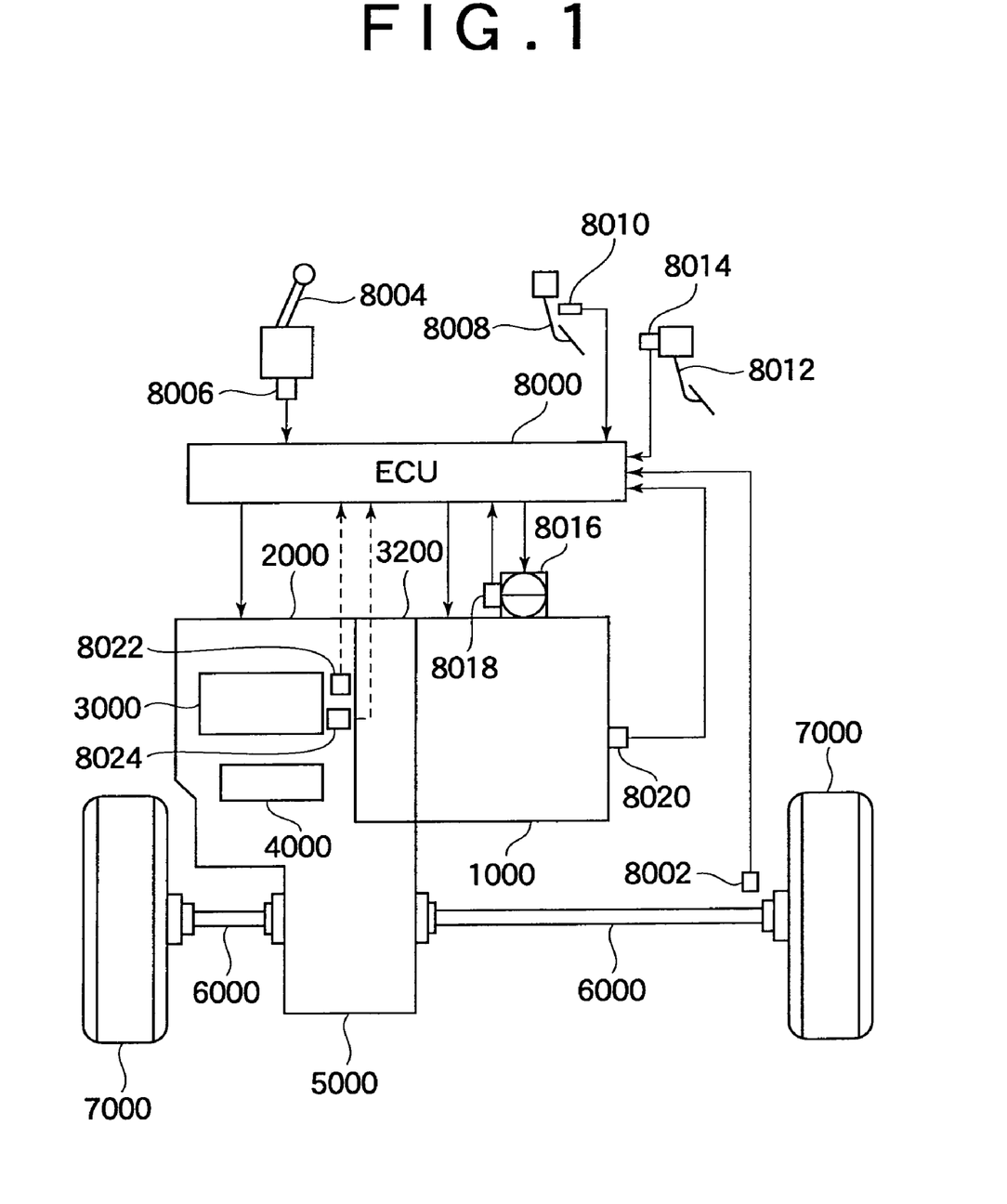
FIG. 1 is a schematic diagram showing a power train of a vehicle according to an embodiment of the invention.

Referring to FIG. 1, a vehicle installed with a control apparatus according to an embodiment of the invention will be described. The vehicle is a front engine front drive (FF) vehicle. Note that a vehicle other than an FF vehicle may be used.

The vehicle includes an engine 1000, an automatic transmission 2000, a planetary gear unit 3000 constituting a part of the automatic transmission 2000, a hydraulic circuit 4000 constituting a part of the automatic transmission 2000, a differential gear 5000, a drive shaft 6000, drive wheels 7000, and an Electronic Control Unit (ECU) 8000. The control apparatus for an automatic transmission according to the invention is realized by the ECU 8000.

The engine 1000 is an internal combustion engine that burns an air/fuel mixture containing fuel injected from an injector (not shown) and air in a combustion chamber of a cylinder. Through this combustion, a piston in the cylinder is pressed down, causing a crankshaft to rotate.

The automatic transmission 2000 is coupled to the engine 1000 via a torque converter 3200. The automatic transmission 2000 shifts a rotation speed of the crankshaft to a desired rotation speed by achieving a desired gear position.

An output gear of the automatic transmission 2000 meshes with the differential gear 5000. The drive shaft 6000 is coupled to the differential gear 5000 by a spline fitting or the like. Power is transmitted to the left and right drive wheels 7000 via the drive shaft 6000.

A vehicle speed sensor 8002, a position switch 8006 of a shift lever 8004, an accelerator depression amount sensor 8010 of an accelerator pedal 8008, a stroke sensor 8014 of a brake pedal 8012, a throttle opening sensor 8018 of an electronic throttle valve 8016, an engine rotation speed sensor 8020, an input shaft rotation speed sensor 8022, and an output shaft rotation speed sensor 8024 are connected to the ECU 8000 via a harness or the like.

The vehicle speed sensor 8002 detects a vehicle speed from the rotation speed of the drive shaft 6000. The position switch 8006 detects a position of the shift lever 8004. The accelerator depression amount sensor 8010 detects an operation amount of the accelerator pedal 8008. The stroke sensor 8014 detects an operation amount of the brake pedal 8012. The throttle opening sensor 8018 detects an operation amount of the electronic throttle valve 8016. The engine rotation speed sensor 8020 detects a rotation speed of an output shaft (the crankshaft) of the engine 1000. The input shaft rotation speed sensor 8022 detects an input shaft rotation speed (also referred to hereafter as a turbine rotation speed) NT of the automatic transmission 2000. The output shaft rotation speed sensor 8024 detects an output shaft rotation speed NO of the automatic transmission 2000. Each of these sensors outputs a detection result to the ECU 8000.

The ECU 8000 controls various machines on the basis of signals transmitted from the sensors and maps, programs, and so on stored in a read only memory (ROM) in order to set the vehicle in a desired traveling condition.

In this embodiment, when the shift lever 8004 is positioned in a D (drive) position such that a D (drive) range is selected as a shift range of the automatic transmission 2000, the ECU 8000 controls the automatic transmission 2000 to achieve one gear position in a range of a first speed to a sixth speed. By achieving one gear position in a range of the first speed to the sixth speed, the automatic transmission 2000 can transmit a driving force to the drive wheels 7000.

When the shift lever 8004 is positioned in an N (neutral) position such that an N (neutral) range is selected as the shift range of the automatic transmission 2000, the ECU 8000 controls the automatic transmission 2000 to a neutral state (a power transmission blocked state).

Figure 2:
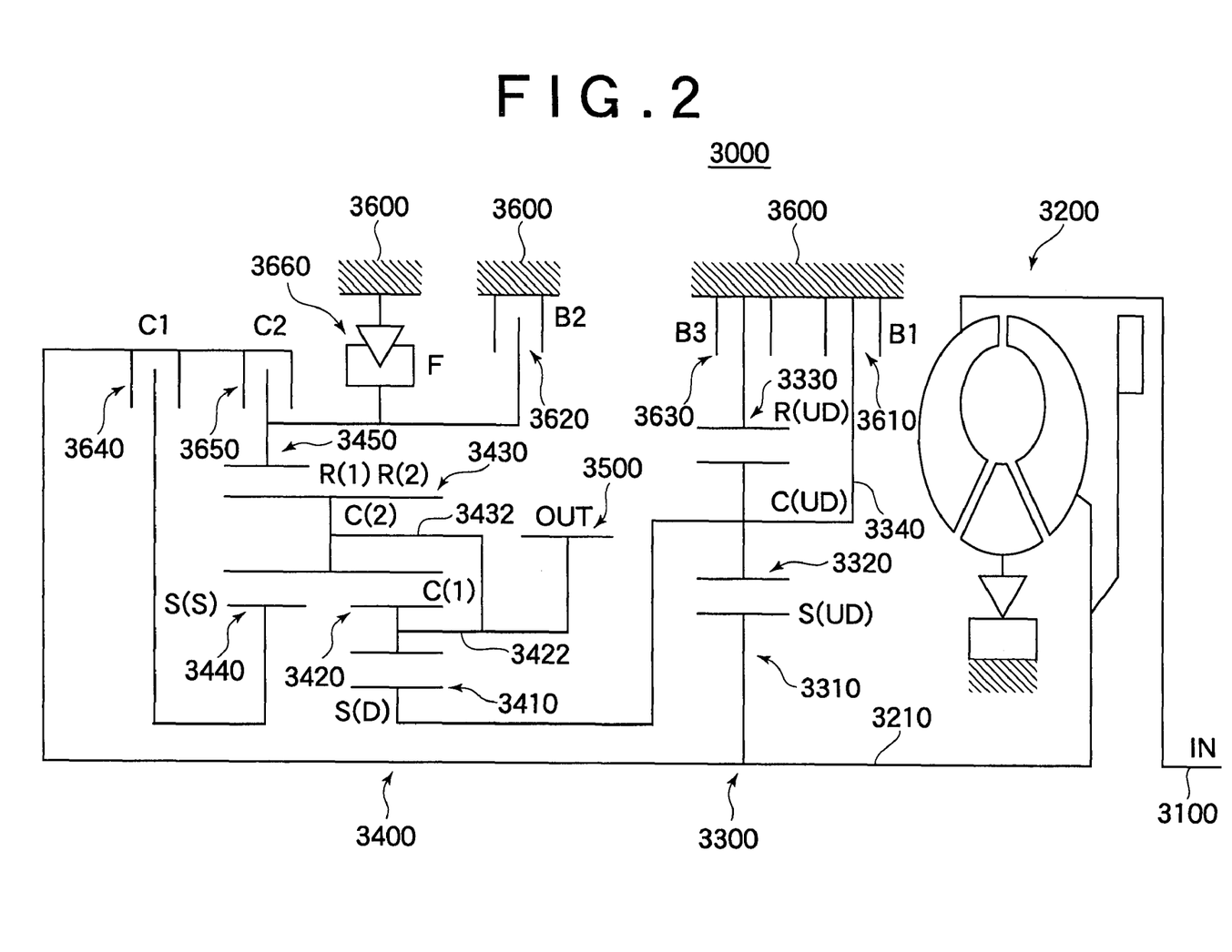
FIG. 2 is a skeleton diagram showing a gear train of an automatic transmission according to an embodiment of the invention.

Referring to FIG. 2, the planetary gear unit 3000 provided in the automatic transmission 2000 will be described. The planetary gear unit 3000 is connected to a torque converter 3200 having an input shaft 3100 that is coupled to the crankshaft. The planetary gear unit 3000 includes a planetary gear mechanism first set 3300, a planetary gear mechanism second set 3400, an output gear 3500, a B1 brake 3610, a B2 brake 3620, and a B3 brake 3630, which are fixed to a gear case 3600, a C1 clutch 3640, a C2 clutch 3650, and a one-way clutch F3660.

The first set 3300 is a single pinion type planetary gear mechanism. The first set 3300 includes a sun gear S (UD) 3310, a pinion gear 3320, a ring gear R (UD) 3330, and a carrier C (UD) 3340.

The sun gear S (UD) 3310 is coupled to an output shaft 3210 of the torque converter 3200. The pinion gear 3320 is supported by the carrier C (UD) 3340 to be free to rotate. The pinion gear 3320 meshes with the sun gear S (UD) 3310 and the ring gear R (UD) 3330.

The ring gear R (UD) 3330 is fixed to the gear case 3600 by the B3 brake 3630. The carrier C (UD) 3340 is fixed to the gear case 3600 by the B1 brake 3610.

The second set 3400 is a Ravigneaux type planetary gear mechanism. The second set 3400 includes a sun gear S (D) 3410, a short pinion gear 3420, a carrier C (1) 3422, a long pinion gear 3430, a carrier C (2) 3432, a sun gear S (S) 3440, and a ring gear R (1) (R (2)) 3450.

The sun gear S (D) 3410 is coupled to the carrier C (UD) 3340. The short pinion gear 3420 is supported by the carrier C (1) 3422 to be free to rotate. The short pinion gear 3420 meshes with the sun gear S (D) 3410 and the long pinion gear 3430. The carrier C (1) 3422 is coupled to the output gear 3500.

The long pinion gear 3430 is supported by the carrier C (2) 3432 to be free to rotate. The long pinion gear 3430 meshes with the short pinion gear 3420, the sun gear S (S) 3440, and the ring gear R (1) (R (2)) 3450. The carrier C (2) 3432 is coupled to the output gear 3500.

The sun gear (S) 3440 is coupled to the output shaft 3210 of the torque converter 3200 by the C1 clutch 3640. The ring gear R (1) (R (2)) 3450 is fixed to the gear case 3600 by the B2 brake 3620 and coupled to the output shaft 3210 of the torque converter 3200 by the C2 clutch 3650. Further, the ring gear R (1) (R (2)) 3450 is coupled to the one-way clutch F3660 to be incapable of rotating during driving in the first speed.

The one-way clutch F3660 is provided parallel to the B2 brake 3620. More specifically, an outer race of the one-way clutch F3660 is fixed to the gear case 3600, while an inner race is coupled to the ring gear R (1) (R (2)) 3450 via a rotary shaft.

Figure 3:
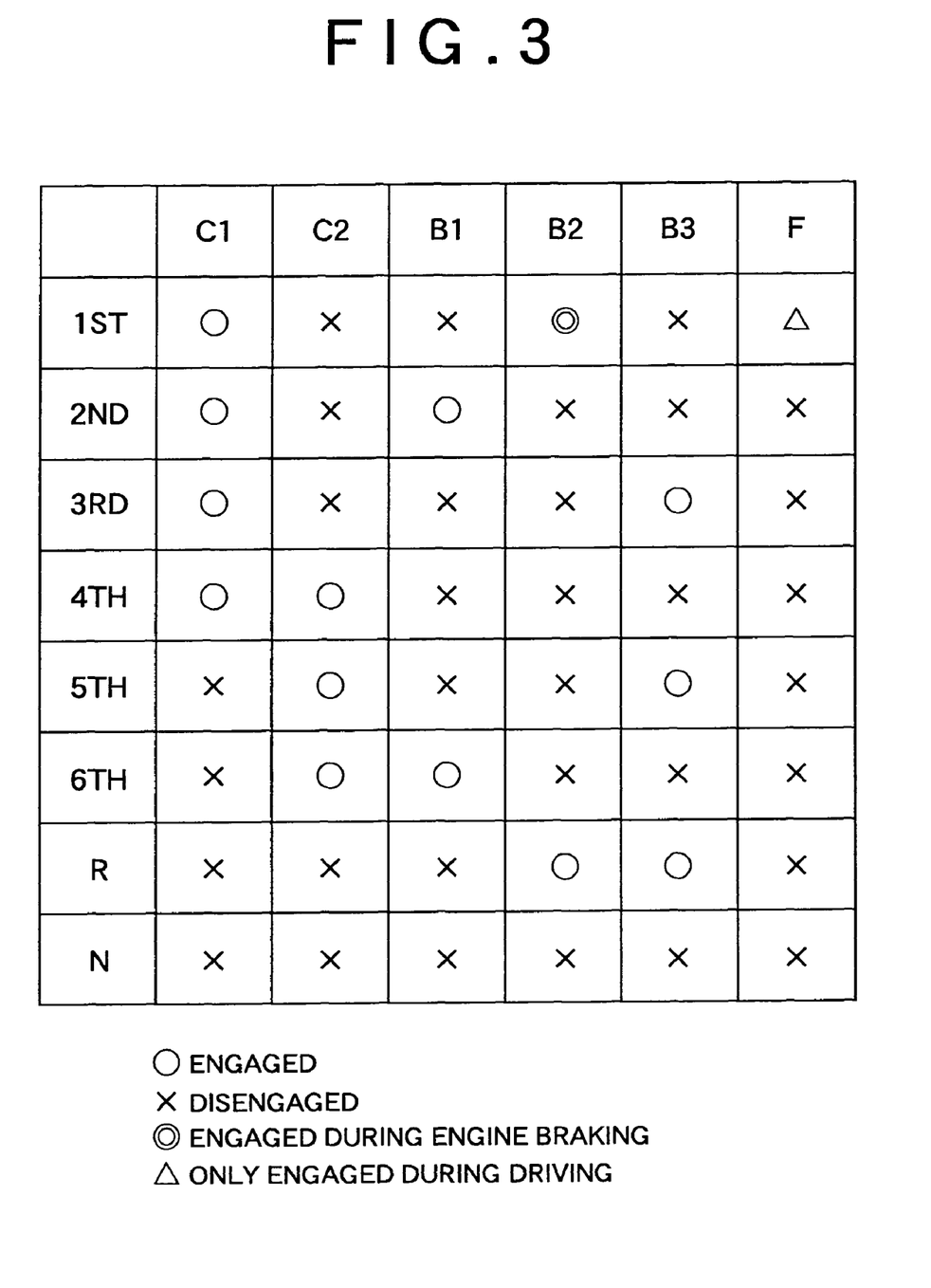
FIG. 3 is a view showing an operating table of the automatic transmission according to an embodiment of the invention.

FIG. 3 shows an operating table expressing relationships between respective gear positions and operating states of the respective clutch elements and brake elements. By operating the respective brake elements B1 to B3, which are so-called reaction elements, and the respective clutch elements C1, C2, which are so-called input elements, in the combinations shown in the operating table, first speed to sixth speed forward gear positions and a reverse gear position are achieved.

As shown in FIG. 3, the C1 clutch 3640 is an input clutch that is engaged in all gear positions from the first speed to the fourth speed. The C2 clutch 3650 is an input clutch that is engaged in the fourth, fifth and sixth speeds.

The B1 brake 3610 and B3 brake 3630 are all reaction brakes that receive and hold a reaction force from the input clutches (the C1 clutch 3640 and C2 clutch 3650). B2 brake 3620 is reaction brake that receive and hold a reaction force from the C1 clutch 3640.

Note that in the gear position combinations shown in FIG. 3, an input torque of the automatic transmission 2000 is transmitted to an output shaft of the automatic transmission 2000 even when a reaction brake is disengaged and an input clutch is engaged individually. However, when an input clutch is disengaged and a reaction brake is engaged individually, the input torque of the automatic transmission 2000 is not transmitted to the output shaft of the automatic transmission 2000.

Figure 4:
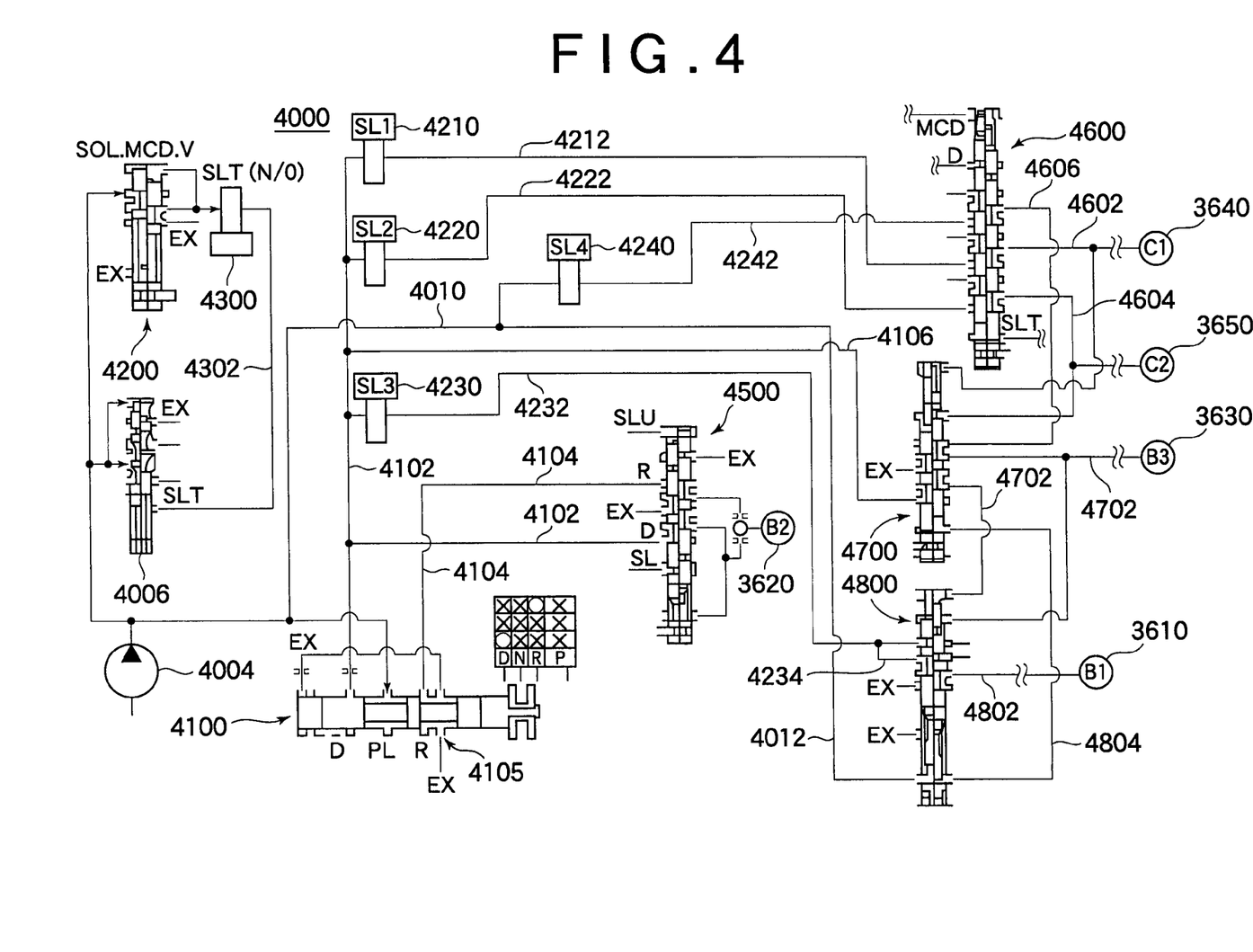
FIG. 4 is a view showing a hydraulic circuit in the automatic transmission according to an embodiment of the invention.

Referring to FIG. 4, the main parts of the hydraulic circuit 4000 will be described. Note that the hydraulic circuit 4000 is not limited to the circuit to be described below.

The hydraulic circuit 4000 includes an oil pump 4004, a primary regulator valve 4006, a manual valve 4100, a solenoid modulator valve 4200, an SL1 linear solenoid (to be referred to as SL (1) hereafter) 4210, an SL2 linear solenoid (to be referred to as SL (2) hereafter) 4220, an SL3 linear solenoid (to be referred to as SL (3) hereafter) 4230, an SL4 linear solenoid (to be referred to as SL (4) hereafter) 4240, an SLT linear solenoid (to be referred to as SLT hereafter) 4300, a B2 control valve 4500, a sequence valve 4600, a clutch apply control valve 4700, and a B1 apply control valve 4800.

The oil pump 4004 is coupled to the crankshaft of the engine 1000. When the crankshaft rotates, the oil pump 4004 is driven to generate oil pressure. The oil pressure generated by the oil pump 4004 is regulated by the primary regulator valve 4006 to generate a line pressure.

The primary regulator valve 4006 causes a throttle pressure regulated by the SLT 4300 to act as a pilot pressure. The line pressure is supplied to the manual valve 4100 and the SL (4) 4240 via a line pressure oil passage 4010.

The manual valve 4100 includes a drain port 4105. By discharging working oil from a D range pressure oil passage 4102 and an R range pressure oil passage 4104 though the drain port 4105, the oil pressure of the D range pressure oil passage 4102 and R range pressure oil passage 4104 can be reduced. When a spool of the manual valve 4100 is in a D position, the line pressure oil passage 4010 communicates with the D range pressure oil passage 4102 such that working oil is supplied from the line pressure oil passage 4010 to the D range pressure oil passage 4102. In other words, oil pressure (D range pressure) is supplied to the D range pressure oil passage 4102. At this time, the R range pressure oil passage 4104 communicates with the drain port 4105, and therefore the working oil in the R range pressure oil passage 4104 is discharged through the drain port 4105 such that oil pressure (R range pressure) is removed from the R range pressure oil passage 4104.

When the spool of the manual valve 4100 is in an R position, the line pressure oil passage 4010 communicates with the R range pressure oil passage 4104 such that working oil is supplied from the line pressure oil passage 4010 to the R range pressure oil passage 4104, and as a result, R range pressure is generated in the R range pressure oil passage 4104. At this time, the D range pressure oil passage 4102 communicates with the drain port 4105, and therefore the working oil in the D range pressure oil passage 4102 is discharged through the drain port 4105 such that the D range pressure is removed from the D range pressure oil passage 4102.

When the spool of the manual valve 4100 is in an N position, both the D range pressure oil passage 4102 and the R range pressure oil passage 4104 communicate with the drain port 4105 such that the working oil in the D range pressure oil passage 4102 and the working oil in the R range pressure oil passage 4104 are discharged through the drain port 4105. As a result, the D range pressure is not generated in the D range pressure oil passage 4102, and the R range pressure is removed from the R range pressure oil passage 4104.

The D range pressure supplied to the D range pressure oil passage 4102 is supplied to the clutch apply control valve 4700 via the SL (1) 4210, the SL (2) 4220, the SL (3) 4230, and the oil passage 4106. The D range pressure is supplied to the B1 brake 3610, B2 brake 3620, C1 clutch 3640, and C2 clutch 3650. The R range pressure is supplied to the B2 brake 3620.

The solenoid modulator valve 4200 regulates oil pressure (solenoid modulator pressure) supplied to the SLT 4300 to a fixed pressure using the line pressure as a source pressure.

The SLT 4300 generates the throttle pressure by regulating the solenoid modulator pressure in accordance with a control signal from the ECU 8000 based on the accelerator depression amount detected by the accelerator depression amount sensor 8010. The throttle pressure is supplied to the primary regulator valve 4006 via an SLT oil passage 4302. The throttle pressure is used as the pilot pressure of the primary regulator valve 4006.

The B2 control valve 4500 supplies oil pressure from either the D range pressure oil passage 4102 or the R range pressure oil passage 4104 selectively to the B2 brake 3620. The D range pressure oil passage 4102 and R range pressure oil passage 4104 are connected to the B2 control valve 4500. The B2 control valve 4500 is controlled by oil pressure supplied from an SL solenoid valve (not shown) and an SLU solenoid valve (not shown), and a biasing force of a spring.

When the SL solenoid valve is OFF and the SLU solenoid valve is ON, the B2 control valve 4500 enters a state shown on the left side of FIG. 4. In this case, oil pressure obtained by regulating the D range pressure using oil pressure supplied from the SLU solenoid valve as a pilot pressure is supplied to the B2 brake 3620.

When the SL solenoid valve is ON and the SLU solenoid valve is OFF, the B2 control valve 4500 enters a state shown on the right side of FIG. 4. In this case, the R range pressure is supplied to the B2 brake 3620.

The SL (1) 4210 regulates oil pressure supplied to the C1 clutch 3640 via the sequence valve 4600. The SL (2) 4220 regulates oil pressure supplied to the C2 clutch 3650 via the sequence valve 4600. The SL (3) 4230 regulates oil pressure supplied to the B1 brake 3610 via the B1 apply control valve 4800. The SL (4) 4240 regulates oil pressure supplied to the B3 brake 3630 via the sequence valve 4600 and the clutch apply control valve 4700.

Note that the SL (1) 4210, SL (2) 4220, SL (3) 4230, SL (4) 4240, and SLT 4300 are controlled by control signals transmitted from the ECU 8000.

The SL (1) 4210 and the sequence valve 4600 are connected by an oil passage 4212. The SL (2) 4220 and the sequence valve 4600 are connected by an oil passage 4222. The SL (4) 4240 and the sequence valve 4600 are connected by an oil passage 4242.

The sequence valve 4600 is controlled by oil pressure supplied from the SLT 4300 and the solenoid modulator valve 4200, and a biasing force of a spring.

When the spool of the manual valve 4100 is in the D position and conditions of the sequence valve 4600 are normal, the sequence valve 4600 enters a state shown on the right side of FIG. 4. At this time, the oil passage 4212 communicates with an oil passage 4602 connected to the C1 clutch 3640, the oil passage 4222 communicates with an oil passage 4604 connected to the C2 clutch 3650, and the oil passage 4242 communicates with an oil passage 4606 connected to the clutch apply control valve 4700. The oil passages 4602, 4604 and 4606 are respectively connected to the clutch apply control valve 4700.

In shift positions other than the fourth speed, the clutch apply control valve 4700 enters a state shown on the right side of FIG. 4. More specifically, the clutch apply control valve 4700 is controlled by oil pressure supplied to a spool upper portion from the oil passage 4602, an oil pressure supplied to a spool upper portion side from the oil passage 4604, a line pressure supplied to a lower portion of the spool from an oil passage 4804 via an oil passage 4012 and the B1 apply control valve 4800, and a biasing force of a spring.

In the fourth speed, oil pressure regulated by the SL (1) 4210 and the SL (2) 4220 is supplied to the C1 clutch 3640 and the C2 clutch 3650 in order to set the C1 clutch 3640 and the C2 clutch 3650 in an engaged state. At this time, the clutch apply control valve 4700 enters the state shown on the left side of FIG. 4 when a force for pushing the spool down, which is based on the oil pressure supplied to the spool upper portion side from the oil passages 4602 and 4604, exceeds a resultant force based on the line pressure supplied to the spool lower portion side and the biasing force of the spring.

At this time, the oil passage 4106 communicates with an oil passage 4704 connected to a spool upper portion of the B1 apply control valve 4800. Hence, the D range pressure is supplied to the spool upper portion of the B1 apply control valve 4800 via the oil passage 4106 and the oil passage 4704.

Meanwhile, in gear positions other than the fourth speed, the oil pressure regulated by the SL (1) 4210 and the SL (2) 4220 is supplied to either the C1 clutch 3640 or the C2 clutch 3650 in, order to set either the C1 clutch 3640 or the C2 clutch 3650 in an engaged state. At this time, the force for pushing the spool down, which is based on the oil pressure supplied to the spool upper portion side from the oil passages 4602 and 4604, is lower than the resultant force based on the line pressure supplied to the spool lower portion and the biasing force of the spring, and therefore the clutch apply control valve 4700 enters the state shown on the right side of FIG. 4. Accordingly, the oil passage 4606 communicates with an oil passage 4702 connected to the B3 brake 3630.

The B1 apply control valve 4800 is controlled by oil pressure supplied to a spool upper portion from the oil passage 4704, oil pressure supplied to a spool upper portion side from the oil passage 4702 connected to the B3 brake 3630, oil pressure supplied to a spool lower portion from an oil passage 4012 that branches from the oil passage 4010, oil pressure supplied to the spool upper portion side from an oil passage 4232, and a biasing force of a spring.

When oil pressure is supplied to the oil passage 4702 connected to the B3 brake 3630, a force for pushing the spool down, which is based on the oil pressure supplied to the spool upper portion side, exceeds a resultant force based on the oil pressure supplied to the spool lower portion and the biasing force of the spring, and therefore the B1 apply control valve 4800 enters a state shown on the right side of FIG. 4.

On the other hand, when the oil pressure supplied to the oil passage 4702 connected to the B3 brake 3630 decreases, the force for pushing the spool down, which is based on the oil pressure supplied to the spool upper portion side, falls below the resultant force based on the oil pressure supplied to the spool lower portion and the biasing force of the spring, and therefore the B1 apply control valve 4800 enters a state shown on the left side of FIG. 4.

The SL (3) 4230 is connected to the B1 apply control valve 4800 via the oil passage 4232. Further, an oil passage 4234 that branches from a midway point of the oil passage 4232 is also connected to the B1 apply control valve 4800. When the B1 apply control valve 4800 enters the state shown on the left side of FIG. 4, the oil passage 4234 communicates with an oil passage 4802 connected to the B1 brake 3610.

In the vehicle constituted as described above, when a driver depresses the accelerator pedal suddenly and greatly or the like, for example, the ECU 8000 determines that a direct shift in which an intermediate gear position exists between a pre-shift gear position and a post-shift gear position, such as a shift from the sixth speed to the third speed or a shift from the fifth speed to the second speed, is to be performed. Having determined that a direct shift is to be performed, the ECU 8000 performs the shift by achieving the post-shift gear position directly from the pre-shift gear position, i.e. without achieving the intermediate gear position.

For example, when a direct shift is performed from the fifth speed to the second speed, the ECU 8000 achieves the second speed directly without achieving an intermediate gear position, i.e. the third speed or the fourth speed. More specifically, the ECU 8000 disengages the C2 clutch 3650 and the B3 brake 3630 and engages the B1 brake 3610 and the C1 clutch 3640.

Conventionally, when it is determined during this type of direct shift that a shift is to be performed to a new gear position in accordance with an accelerator pedal depression increase or depression reduction by the driver or the like, the direct shift is completed first, and the shift to the new gear position is executed following completion of the direct shift. As a result, a time lag occurs in realizing the driving force (gear position) requested by the driver.

In this embodiment, when it is determined that a shift is to be performed to a new gear position during a direct shift but before engagement of the input clutch (input element) for the post-direct shift gear position begins, the direct shift is halted, and the shift to the new gear position is performed.

Figure 5:
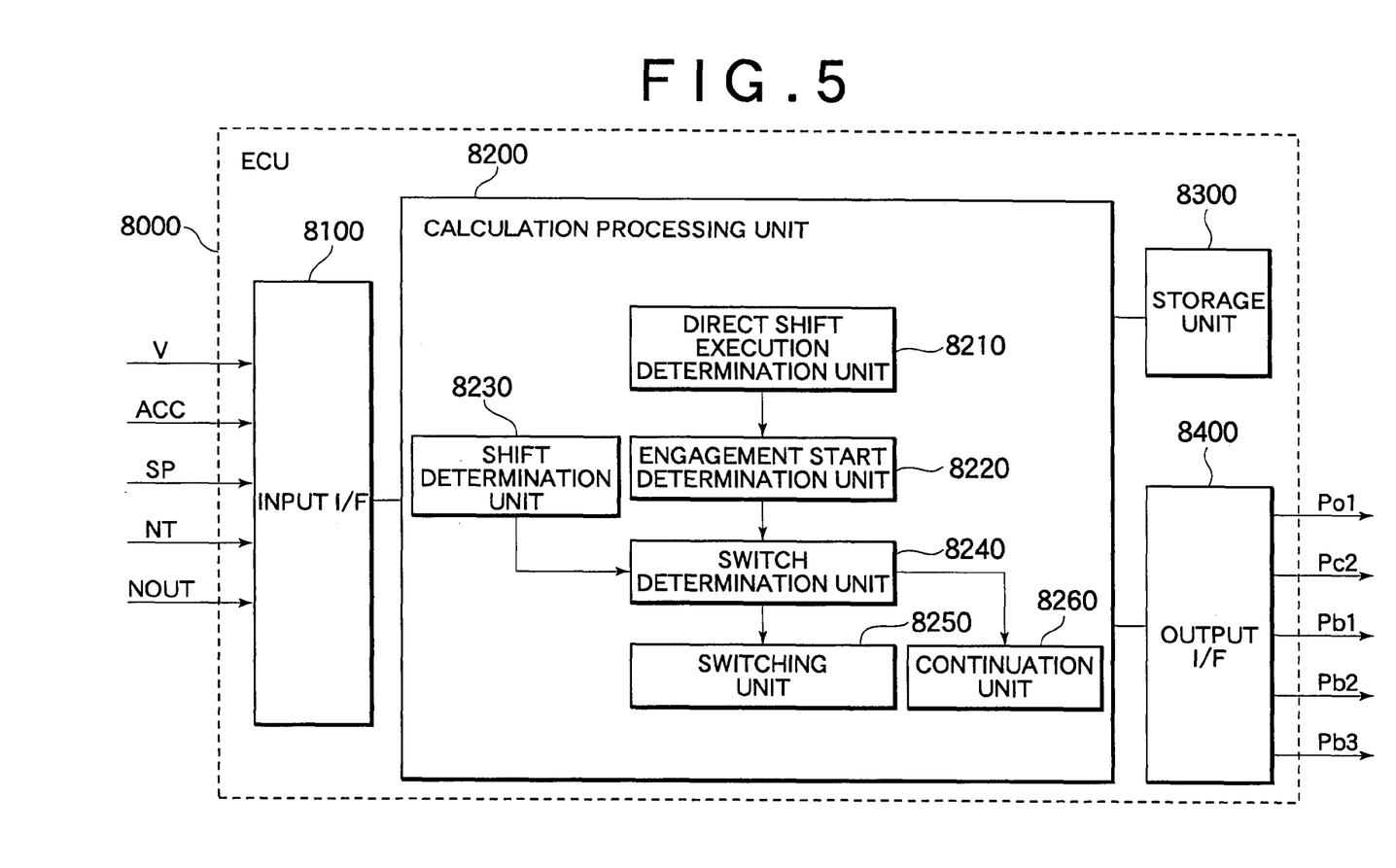
FIG. 5 is a functional block diagram of an ECU according to an embodiment of the invention.

FIG. 5 is a functional block diagram of the ECU 8000. As shown in FIG. 5, the ECU 8000 is provided with an input interface 8100 that receives signals from the respective sensors and so on, a calculation processing unit 8200 constituted mainly by a central processing unit (CPU), a storage unit 8300 realized by a ROM or the like, which stores various information such as thresholds and maps and various programs, and an output interface 8400 that transmits control signals (oil pressure command values) based on results calculated by the calculation processing unit 8200 to the respective solenoids of the hydraulic circuit 4000.

The calculation processing unit 8200 includes a direct shift execution determination unit 8210, an engagement start determination unit 8220, a shift determination unit 8230, a switch determination unit 8240, a switching unit 8250, and a continuation unit 8260.

The direct shift execution determination unit 8210 determines whether or not a direct shift is underway. As described above, when a direct shift is performed, the ECU 8000 executes input clutch disengagement control to lower an oil pressure command value relating to the input clutch for the pre-shift gear position, reaction brake disengagement control to lower an oil pressure command value relating to the reaction brake for the pre-shift gear position, reaction brake engagement control to increase an oil pressure command value relating to the reaction brake for the post-shift gear position, and input clutch engagement control to increase an oil pressure command value relating to the input clutch for the post-shift gear position.

For example, when a direct shift is performed from the fifth speed to the second speed, control (input clutch disengagement control) to disengage the C2 clutch 3650 by reducing an oil pressure command value Pc2 for the C2 clutch 3650, control (reaction brake disengagement control) to disengage the B3 brake 3630 by reducing an oil pressure command value Pb3 for the B3 brake 3630, control (reaction brake engagement control) to engage the B1 brake 3610 by increasing an oil pressure command value Pb1 for the B1 brake 3610, and control (input clutch engagement control) to engage the C1 clutch 3640 by increasing an oil pressure command value Pc1 for the C1 clutch 3640 are performed.

At this time, control (quick fill control) to increase the responsiveness of the reaction brake engagement control and the input clutch engagement control by supplying working oil to the oil passages in advance is performed respectively at an initial stage of the reaction brake engagement control and an initial stage of the input clutch engagement control.

The engagement start determination unit 8220 determines during execution of a direct shift whether or not engagement of the input clutch for the post-direct shift gear position is yet to begin. When quick fill control on the input clutch for the post-direct shift gear position has not yet begun, the engagement start determination unit 8220 determines that engagement of the input clutch for the post-direct shift gear position is yet to begin. Note that the method of determining whether or not engagement of the input clutch for the post-direct shift gear position is yet to begin is not limited to this method. For example, it may be determined that engagement of the input clutch for the post-direct shift gear position is yet to begin when an elapsed time from the start of quick fill control on the input clutch for the post-direct shift gear position has not reached a predetermined time (in other words, when the quick fill control is still underway and it is assumed that engagement of the input clutch has not actually begun).

The shift determination unit 8230 determines a target gear position on the basis of a shift map (not shown) having the vehicle speed and the accelerator depression amount as parameters.

The switch determination unit 8240 determines whether or not the shift determination unit 8230 has determined that a shift is to be performed to a new target gear position before engagement of the input clutch for the post-direct shift gear position begins (i.e. whether or not the post-direct shift gear position and the target gear position are different from each other). The determination result serves as a condition for determining whether or not to halt execution of the direct shift and switch to a shift to the new target gear position.

More specifically, when the shift determination unit 8230 determines that a shift is to be performed to a new target gear position before engagement of the input clutch for the post-direct shift gear position begins, the switching unit 8250 halts execution of the direct shift and switches to a shift to the new target gear position. For example, when the driver reduces depression of the accelerator pedal such that the target gear position is switched to the third speed before engagement of the second speed input clutch (the C1 clutch 3640) begins during a direct shift from the fifth speed to the second speed, the switching unit 8250 halts engagement control of the second speed reaction brake (the B1 brake 3610), even if this engagement control has already begun, and executes engagement control on the third speed reaction brake (the B3 brake 3630).

When the shift determination unit 8230 determines that a shift is to be performed to the new target gear position after engagement of the post-direct shift gear position input clutch begins, the continuation unit 8260 continues execution of the direct shift. Note that the shift to the new target gear position is executed once execution of the direct shift is complete.

The functions described above may be realized using software or hardware.

Figure 6:
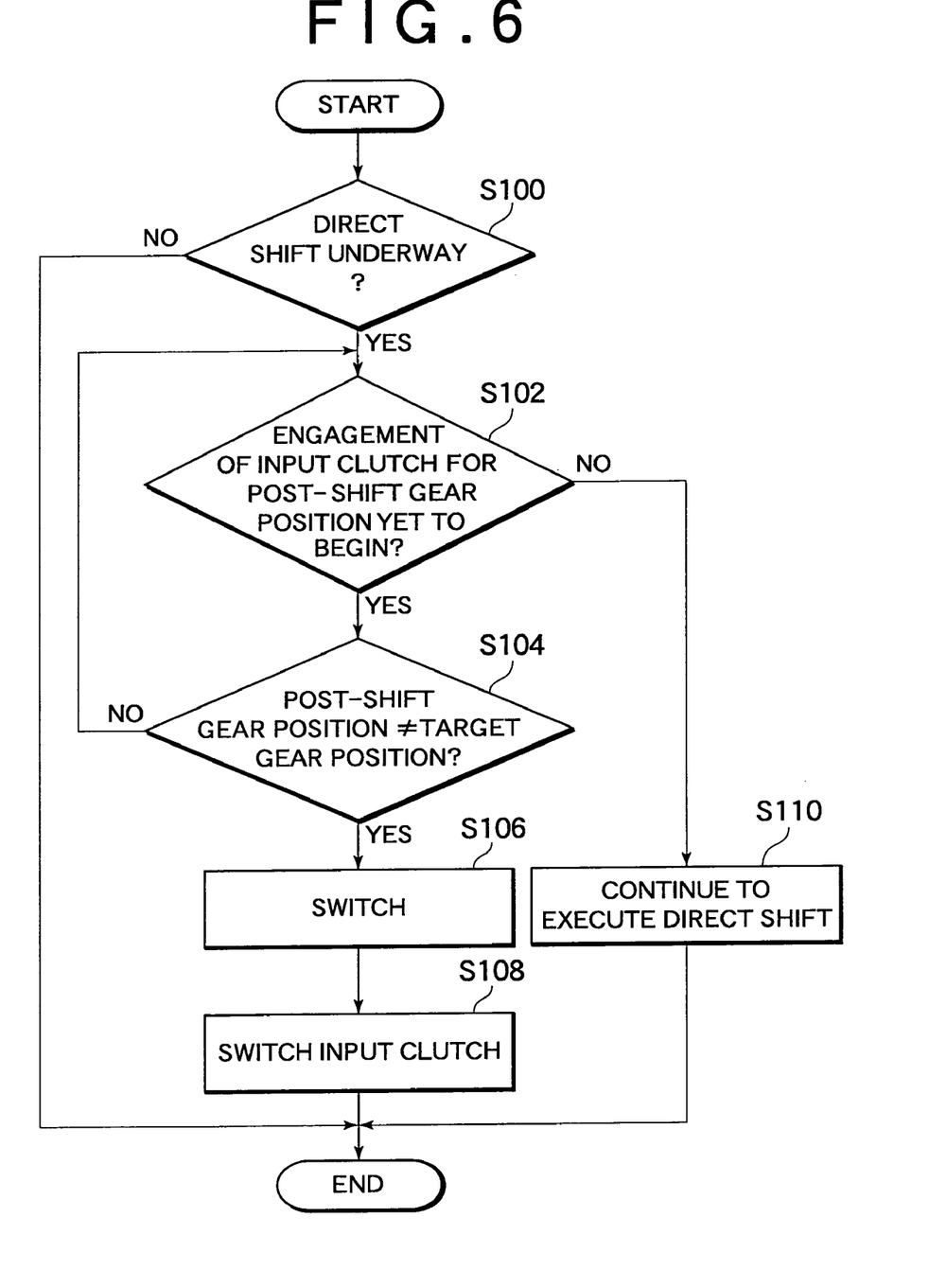
FIG. 6 is a view showing a processing flow of the ECU according to an embodiment of the invention.

FIG. 6 shows a processing flow of the ECU 8000 when the functions described above are realized using software. Note that this processing is executed repeatedly at predetermined cycle times.

As shown in FIG. 6, in a step (to be abbreviated to S hereafter) 100, the ECU 8000 determines whether or not a direct shift is underway. When an affirmative determination is made by this processing (YES in S100), the processing advances to S102. When a negative determination is made (NO in S100), the processing is terminated.

In S102, the ECU 8000 determines whether or not engagement of the input clutch for the post-direct shift gear position is yet to begin. For example, when quick fill control on the input clutch for the post-direct shift gear position has not begun, the ECU 8000 determines that engagement of the input clutch for the post-direct shift gear position is yet to begin. As described above, it may be determined that engagement of the input clutch for the post-direct shift gear position is yet to begin when an elapsed time from the start of quick fill control on the input clutch for the post-direct shift gear position has not reached a predetermined time (in other words, when the quick fill control is still underway and it is assumed that engagement of the input clutch has not actually begun), for example. When an affirmative determination is made by this processing (YES in S102), the processing advances to S104. When a negative determination is made (NO in S102), the processing advances to S110.

In S104, the ECU 8000 determines whether or not the post-direct shift gear position differs from the target gear position. When an affirmative determination is made by this processing (YES in S104), the ECU 8000 determines that a shift is to be performed to a new target gear position before engagement of the input clutch for the post-direct shift gear position begins, and therefore the processing advances to S106. When a negative determination is made (NO in S104), the processing returns to S102.

In S106, the ECU 8000 switches the reaction brake on which engagement control is to be performed. In other words, engagement control is executed on the reaction brake for the new target gear position instead of performing engagement control on the reaction brake for the post-direct shift gear position. Note that when the reaction brake for the post-direct shift gear position is identical to the reaction brake for the new target gear position, engagement control on the reaction brake for the post-direct shift gear position is continued as is.

In S108, the ECU 8000 switches the input clutch on which engagement control is to be performed. In other words, engagement control is executed on the input clutch for the new target gear position instead of performing engagement control on the input clutch for the post-direct shift gear position. Note that when the input clutch for the post-direct shift gear position is identical to the input clutch for the new target gear position, engagement control on the input clutch for the post-direct shift gear position is continued as is.

In S110, the ECU 8000 continues to execute the direct shift. The shift control executed by the ECU 8000 serving as the control apparatus for an automatic transmission according to this embodiment, which is based on the above structures and flowchart, will be described with reference to FIG. 7.

Figure 7:
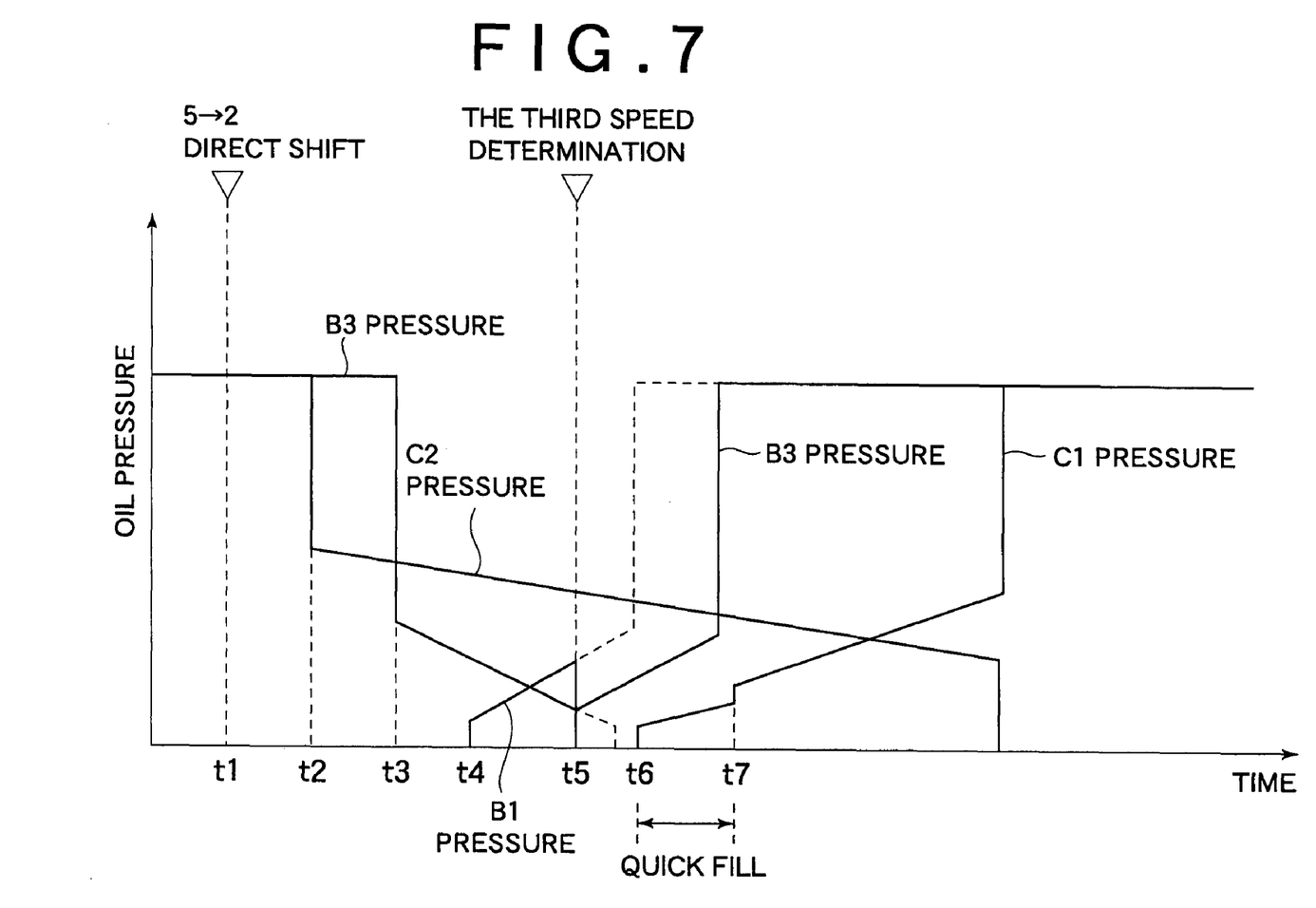
FIG. 7 is a timing chart relating to an embodiment of the invention and showing oil pressure supplied to various engagement elements when it is determined that a shift is to be performed to a new gear position during a direct shift.

FIG. 7 is a timing chart showing the oil pressure of the respective input clutches and reaction brakes when it is determined that a new shift is to be performed to the third speed during a direct shift from the fifth speed to the second speed.

As shown in FIG. 7, when a direct shift from the fifth speed to the second speed is output at a time t1, oil pressure (C2 pressure) reduction in relation to the C2 clutch 3650 serving as the input clutch for the fifth speed (input clutch disengagement control) is begun at a time t2, and oil pressure (B3 pressure) reduction in relation to the B3 brake 3630 serving as the reaction brake for the fifth speed (reaction brake disengagement control) is begun at a time t3.

Further, oil pressure (B1 pressure) increasing on the B1 brake 3610 serving as the reaction brake of the second speed (reaction brake engagement control) is begun.

However, in the case shown in FIG. 7, at a time t5, which is prior to a time t6 at which oil pressure (C1 pressure) increasing on the C1 clutch 3640 serving as the input clutch for the second speed (input clutch engagement control) is begun, it is determined in accordance with an accelerator pedal depression reduction by the driver or the like that a new shift is to be performed to the third speed.

Conventionally in such a case, a shift from the second speed to the third speed is executed after completing the direct shift from the fifth speed to the second speed. As a result, a time lag occurs in realizing the driving force requested by the driver (the driving force correspond to the third speed).

However, as long as engagement of the input clutch (the C1 clutch 3640) has not begun at a time t4, an output shaft torque of the automatic transmission 2000 does not vary in accordance with variation in the engagement state of the B1 brake 3610 and the B3 brake 3630 even when the reaction brake is switched from the B1 brake 3610 to the B3 brake 3630, and therefore the behavior of the vehicle is not affected.

Hence, the ECU 8000 according to this embodiment, having determined that a shift is to be performed to the third speed before increasing of the C1 pressure begins (YES in S100, YES in S102, YES in S104), reduces the increasing B1 pressure and starts to increase the B3 pressure (S106) at the time t5. Next, at the time t6, the ECU 8000 starts to increase the oil pressure (C1 pressure) of the C1 clutch 3640 serving as the input clutch of the third speed (S108).

As a result, it is possible to respond favorably to the driving force request (the shift request to the third speed) issued by the driver without generating shift shock.

In the control apparatus for an automatic transmission according to this embodiment, as described above, when it is determined that a shift is to be performed to a new gear position before engagement of the input clutch for the post-shift gear position begins during a direct shift in which engagement control is performed on the input clutch for the post-shift gear position and the reaction brake for the post-shift gear position while performing disengagement control on the input clutch for the pre-shift gear position and the reaction brake for the pre-shift gear position, the direct shift is halted and a shift is performed to the new gear position. As a result, the shift to the new shift position requested by the driver can be realized promptly without generating shift shock.

Note that a period extending from the time t6 to a time t7 in FIG. 7 corresponds to a quick fill control period of the C1 clutch 3640. In other words, it is assumed that between the time t6 and the time t7, engagement of the C1 clutch 3640 has not yet actually begun. Therefore, as described above, when the control apparatus determines that a new shift is to be performed to the third speed during quick fill control of the C1 clutch 3640 (before the time t7 at which the elapsed time from the time t6 reaches the predetermined time), the direct shift from the fifth speed to the second speed may be halted and the shift to the third speed may be begun.

It should be assumed that all points of the embodiment disclosed here are examples and do not limit the invention. The scope of the invention is defined by the scope of the claims rather than the above description, and is intended to include all modifications having an equivalent significance and scope to the scope of the claims.

The invention claimed is:

1. A control apparatus that controls an automatic transmission in which a first shift position is achieved by engaging a first element and engaging a second element, a second shift position is achieved by engaging a third element and engaging a fourth element, an intermediate shift position exists between the first shift position and the second shift position, the third element does not transmit an input torque of the automatic transmission to an output shaft of the automatic transmission when only the third element is engaged, and the fourth element transmits the input torque of the automatic transmission to the output shaft of the automatic transmission when the fourth element is engaged, the control apparatus comprising:

a first determination unit that determines whether or not engagement of the fourth element is yet to begin during a direct shift in which a shift is performed from the first shift position to the second shift position without passing through the intermediate shift position by disengaging the first element, disengaging the second element, engaging the third element, and engaging the fourth element;

a second determination unit that determines whether or not a shift is to be performed to a third shift position which is different to the second shift position; and a control unit that halts the direct shift and executes a shift to the third shift position when the second determination unit determines that a shift is to be performed to the third shift position before engagement of the fourth element begins.

2. The control apparatus according to claim 1, wherein the second determination unit determines whether or not a shift is to be performed to the third shift position by determining whether or not the second shift position differs from a current target shift position.

3. The control apparatus according to claim 1, wherein, if engagement of the third element has already begun when the second determination unit determines that a shift is to be performed to the third shift position before engagement of the fourth element begins, the control unit halts engagement of the third element and begins disengagement of the third element and engagement of an element for achieving the third shift position.

4. The control apparatus according to claim 1, wherein, the automatic transmission is constituted such that the third shift position is achieved by engaging a fifth element and engaging a sixth element, the fifth element does not transmit the input torque of the automatic transmission to the output shaft of the automatic transmission when only the fifth element is engaged, and the sixth element transmits the input torque of the automatic transmission to the output shaft of the automatic transmission when the sixth element is engaged, and if engagement of the third element has already begun when the second determination unit determines that a shift is to be performed to the third shift position before engagement of the fourth element begins, the control unit halts engagement of the third element, begins disengagement of the third element and engagement of the fifth element, and then begins engagement of the sixth element.

5. The control apparatus according to claim 1, wherein the first determination unit determines that engagement of the fourth element is yet to begin either when engagement control of the fourth element has not yet begun or when an elapsed time from the beginning of engagement control of the fourth element has not yet reached a predetermined time.

6. The control apparatus according to claim 1, wherein the control unit continues the direct shift when it is determined that engagement of the fourth element has begun.

7. The control apparatus according to claim 1, wherein the control unit continues the direct shift when the second determination unit determines that a shift is to be performed to the third shift position after engagement of the fourth element begins.

8. The control apparatus according to claim 1, wherein, the automatic transmission is constituted such that the first element does not transmit the input torque of the automatic transmission to the output shaft of the automatic transmission when only the first element is engaged, and the second element transmits the input torque of the automatic transmission to the output shaft of the automatic transmission when the second element is engaged, and during the direct shift, the control unit begins to disengage the first element after beginning to disengage the second element.

9. A control method for controlling an automatic transmission in which a first shift position is achieved by engaging a first element and engaging a second element, a second shift position is achieved by engaging a third element and engaging a fourth element, an intermediate shift position exists between the first shift position and the second shift position, the third element does not transmit an input torque of the automatic transmission to an output shaft of the automatic transmission when only the third element is engaged, and the fourth element transmits the input torque of the automatic transmission to the output shaft of the automatic transmission when the fourth element is engaged, the control method comprising:

determining, using an electronic control unit (ECU), whether or not engagement of the fourth element is yet to begin during a direct shift in which a shift is performed from the first shift position to the second shift position without passing through the intermediate shift position by disengaging the first element, disengaging the second element, engaging the third element, and engaging the fourth element;

determining whether or not a shift is to be performed to a third shift position which is different to the second shift position; and     halting the direct shift and executing a shift to the third shift position after determining that a shift is to be performed to the third shift position before engagement of the fourth element begins.

\* \* \* \* \*